United States Patent [19]

Schulten-Baumer

[11] 3,948,612

[45] Apr. 6, 1976

[54] PIG FOR MANUFACTURING CAST IRON

[76] Inventor: Uwe Schulten-Baumer, Hammer Mark 3, Essen, Germany

[22] Filed: Dec. 27, 1973

[21] Appl. No.: 428,863

[30] Foreign Application Priority Data
Dec. 29, 1972  Germany............................ 2263945

[52] U.S. Cl..................... 29/187.5; 75/44 S; 75/48
[51] Int. Cl.² ........................................ B21C 37/00
[58] Field of Search ..... 29/187, 187.5; 75/43, 44 R, 75/44 S, 48

[56] References Cited
UNITED STATES PATENTS
1,666,312   4/1928   Runyan................................. 75/48

FOREIGN PATENTS OR APPLICATIONS
536,003   4/1941   United Kingdom................. 75/44 R
587,480   4/1947   United Kingdom................. 75/44 R Primary Examiner—M. J. Andrews
Attorney, Agent, or Firm—Holman & Stern

[57] ABSTRACT

A pig including a base of pig iron which covers and holds in position a mixture of components including low carbon metallic charge components, scrap iron and solid fuel material. The pig is formed of materials such that it is essentially free of oxides which originate from iron ore.

6 Claims, 6 Drawing Figures

PIG FOR MANUFACTURING CAST IRON

BACKGROUND AND SUMMARY OF THE INVENTION

The present invention is concerned with a pig for manufacturing cast iron. Such types of pigs are, as is understood in the art, foundry pig iron bars. These compact pigs, together with pieces of coke, slag-forming materials, scrap iron, including sprues and returns, steel scrap including chips and turnings, and other metallic intermediate products such as iron sponge, pellets, alloying bases, etc., represent the base material for the melting of cast iron of various compositions.

The particular desired composition of the cast iron is obtained by calculating a so-called charge make-up, and afterwards, the above-mentioned raw materials, having been stored in separate containers, or certain material selected from the raw materials, after weighing of the individual raw materials, are then placed into the smelting furnace.

Accordingly, extensive separate storage arrangements are required, as well as crane installations and weighing devices. Also, sufficient trained technical personnel must be available for the extensive make-up processes.

Due to the varying compositions of some raw materials, the technical personnel should actually be placed in a position so as to be able to examine the raw materials to be used with regard to their composition before they are made up. Such an arrangement would, however, be difficult to carry out and require extensive costs, with the exception of sprues and returns, i.e., the recycled cast iron scrap, the composition of which is already known. A great number of foundries would be unable to bear such costs. Thus, it is necessary to continuously examine and correct the composition of the molten cast iron.

The present invention is concerned with the improvement of the previously mentioned conditions, including the provision for a uniformity of the raw materials in the production of cast iron of a certain grade, and additionally, an improvement in the environmental conditions of the foundry.

This problem is solved primarily by moving charge make-up extensively from the foundry into a pre-phase. The basis therefor is a pig of foundry pig iron, which contains different charge materials. A pig for manufacturing cast iron, preferably in foundry cupolas, comprises according to this invention a pig iron which holds together and extensively includes other charge components.

To such inclusions belong most or all of the remaining metallic charge components, not considering sprues and returns.

These inclusions are essentially steel scrap, scrap iron in general, and intermediate products which are obtained by means of an almost complete reduction of iron ores in a non-molten condition, such as iron sponge, pellets, etc. A high degree of reduction is desired, or necessary, in these materials.

The melting of cast iron can not, without difficulty, tolerate a high content of iron oxides which originate from the ore in the charge material, since it would produce problems for the cast iron melting process which would be technically difficult to solve and would be connected with substantially higher costs. Accordingly, the inclusion of free iron oxides, except lime and other slag-forming components, especially, however, from iron, must be in contradiction to the scope of the present invention. Thus, the amount of iron oxides normally should be less or much less than 10 percent by weight of the pig, should only exceptionally be up to 20 percent by weight.

Furthermore, to the inclusions of the pig belong solid fuel, foundry-coke, briquetted fuel, but also fuels of a lower quality, for example, normal blast-furnace coke, in so far as the fuel will not have to be separately available for the starting of the melting furnace.

It may also be suitable to include in the pig an alloying element or elements prescribed for a certain type of alloy cast iron. The inclusion of fuel in the inventive pig is not considered in such cases in which a smelting furnace is utilized which is operated with electricity or other than solid fuels.

It is within the scope of the present invention that, in general, all charge components which are required for the respective furnace, are contained in the pig. However, it should also still be permissible to charge individual charge components either together or separately.

A further particular feature of the present invention is that the inclusions, especially the metallic charge materials and the fuels, are used in a coarse condition. The preferred piece-sizes are those in the range of from 40 to 70 mm, especially from 45 to 55 mm, in diameter or width, it also being possible to take into account the principle of the "close-packed structure" or "dense spherical packing" with simultaneously maximum pore size.

On the other hand, however, it may also be of advantage that the pieces of the fuel material be about 5 to 10 times as large with regard to the edge-length or diameter, as that of metallic components having a low carbon-content.

The added substances, such as, for example, slag-forming constituents and alloying materials, may already be incorporated in the fuel material. This commonly occurs, for example, by admixing to the coking coal.

The quantities of the "inclusions" should be from 1 to 50% by weight low carbon metallic charge components, from 1 to 30%, scrap iron, 0.1 to 2% lime, and 5 to 15% fuel materials.

The term "foundry pig iron" should not be understood in a limited sense, but, it should include all types of pig iron for the manufacture of cast iron in blast furnaces or remelting furnaces.

BRIEF DESCRIPTION OF THE DRAWINGS

Referring to the drawings.

DESCRIPTION OF THE PREFERRED EMBODIMENTS

Figure 1:
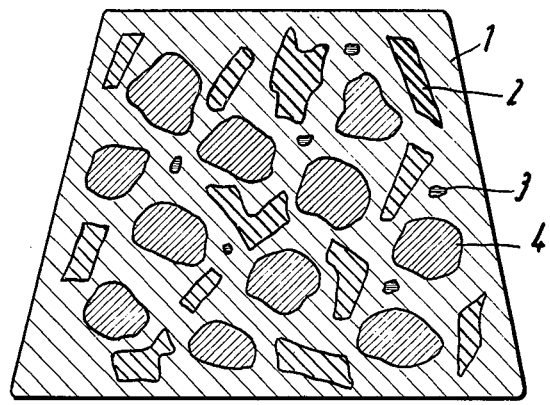
FIG. 1 shows a cross section of a pig of the present invention.
Figure 2A:
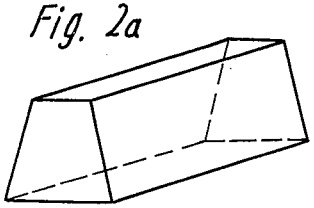
FIGS. 2 a–e provides examples of various geometric shapes for the pig.
Figure 2B:
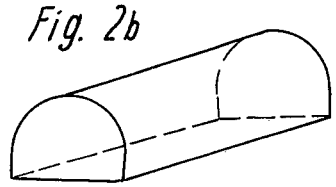
Figure 2C:
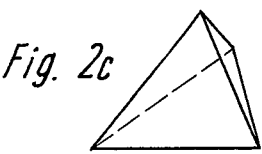
Figure 2D:
Figure 2E:
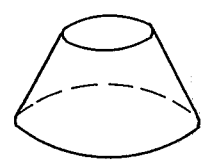

The manufacturing of the pigs of the present invention is relatively straightforward. The components to be included in the pig are placed in pig molds and are enclosed and substantially covered by pouring foundry pig iron over them, the pig iron being at a low pouring temperature of, preferably 1300° to 1350°C during pouring. For example, there is obtained a pig which is necessary for the melting of cast iron of the grade "GG 20" if one pours 30 parts by weight of pig iron (4 – 4.5 % C; 2.5 % Si) over 55 parts by weight of scrap iron (3.0 – 3.3 % C; 1.8 –2.3 % Si), 15 parts by weight of steel scrap (0.1 – 0.3 % C; 0.5 % Si), 10 parts by weight of coke, and 1.5 parts by weight of caustic lime.

In the case of "GG 25" grade cast iron, the above-mentioned materials are made up as follows:
30 parts by weight of pig iron
25 parts by weight of steel scrap
45 parts by weight of scrap iron
10.5 parts by weight of coke
1.6 parts by weight of caustic lime.

As a result of largely covering the charge materials by pig iron, there are developed large-sized charge components which, during the charging of the furnace, keep the abrasion low and thereby reduce the dust-emission of the furnace.

In FIG. 1 there is shown a cross section of a pig of the present invention, containing pig iron 1, steel scrap or scrap iron 2, caustic lime or alloying admixture 3 and coke or other solid fuel material 4.

The suitable form of the pig, for example, trapezohedral, semi-cylindrical, tetrahedral, truncated cone, hemispherical or semi-hemispherical, enables additionally an optimum gaspenetration of the furnace. Tнse forms are shown in FIGS. 2 *a–e*. Due to the extensive covering of the fuel carriers, a further, substantial reduction of dust-emission is obtained since the greatest part of the cupola furnace emission originates from solid fuel bases. The covering also prevents, to a great extent, an indirect reduction of the burned gas, whereby carbon monoxide can be kept at an extremely low level in the stack gas. The extensive decrease of these indirect reductions permits a high saving on fuel with the result that the development of dust as well as the emitted carbon monoxide and sulfur dioxide gas quantities are greatly reduced.

Since, according to the present invention, it is possible to manufacture pigs for the melting of cast iron of any desired composition, they represent the best possible material for use in foundry smelting furnace. In addition, the utilization of the inventive pig simplifies considerably the storage of raw materials in the foundries. Also, there is no necessity for personnel for calculating the charge make-up. Additionally, the utilization of the pigs in foundries enables an extensive automation of the charging process of smelting furnaces, including the fully continuous and automated charging by means of a belt conveyor without any personnel and without any weighing device being necessary.

It is claimed:

1. A molded pig for the production of cast iron comprising pig iron and pieces of solid charge materials including scrap and fuel and consisting essentially of, by weight: 1–50% low-carbon metallic charge components: 1–30% scrap iron said scrap iron having a higher carbon conent than said low-carbon metallic charge components; 5–15% solid carbonaceous fuel material and the balance being pig iron, the pig iron being molten and poured over the charge materials thereby enclosing and substantially covering them.

2. The molded pig of claim 1 wherein the pig contains less than 10 % by weight of free iron oxides which originate from iron ore.

3. The molded pig of claim 1, further including from 0.1 to 2% lime.

4. The molded pig of claim 1 wherein the charge materials are present in pieces of close-packed structures.

5. The molded pig of claim 4 wherein the pieces of the charge have sizes of from 40 to 70 mm.

6. The molded pig of claim 4 wherein sizes of the pieces of the fuel material are 5 to 10 times larger than those of the low-carbon metallic charge components.

* * * * *